Feb. 8, 1927. 1,616,613
C. F. DRUMM ET AL
CUSHION CONNECTION FOR VEHICLE CONSTRUCTION
Filed Oct. 2, 1925 2 Sheets-Sheet 1
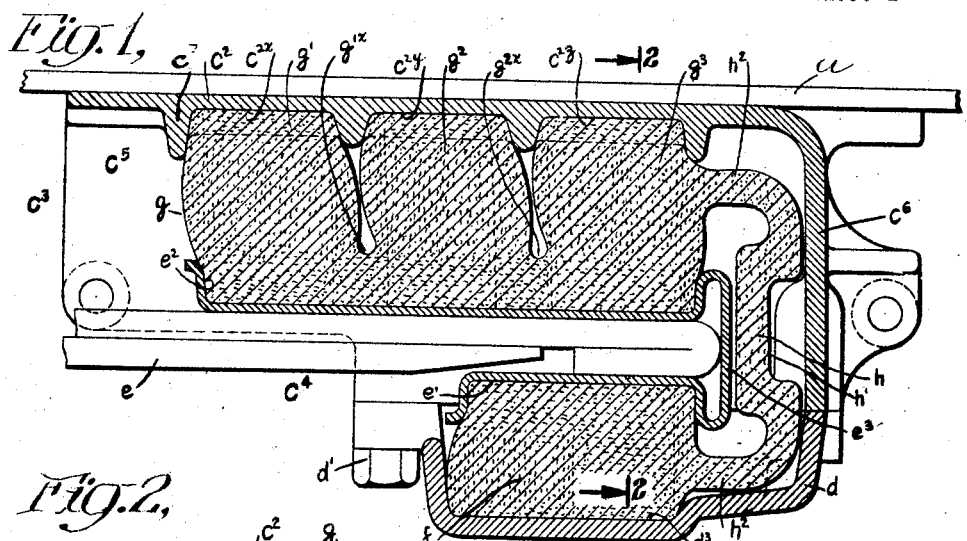
Fig.1,
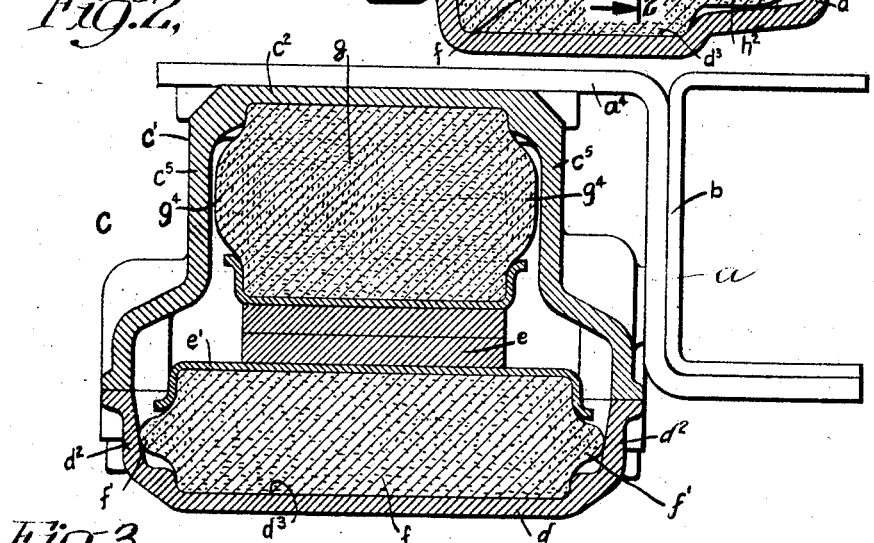
Fig.2,
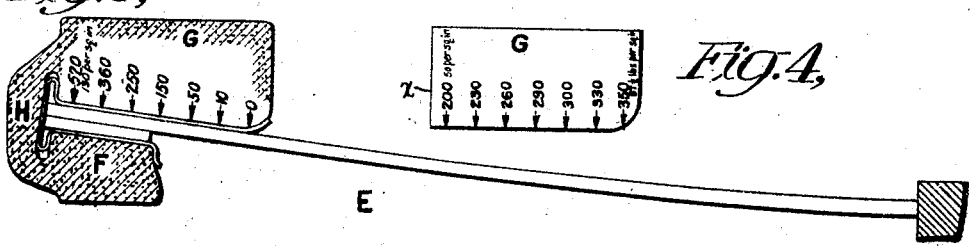
Fig.3, Fig.4,
Inventors
CHARLES F. DRUMM & ERVING R GURNEY
By their Attorneys
Redding, Greeley, O'Shea & Campbell

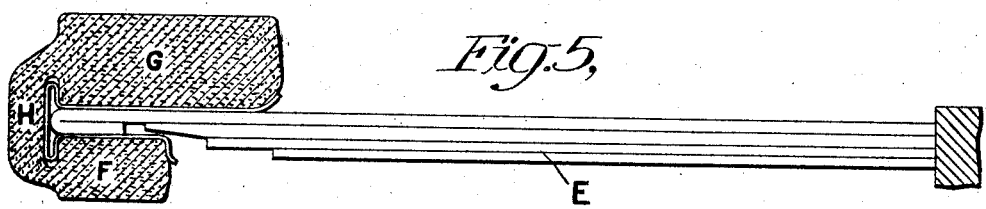
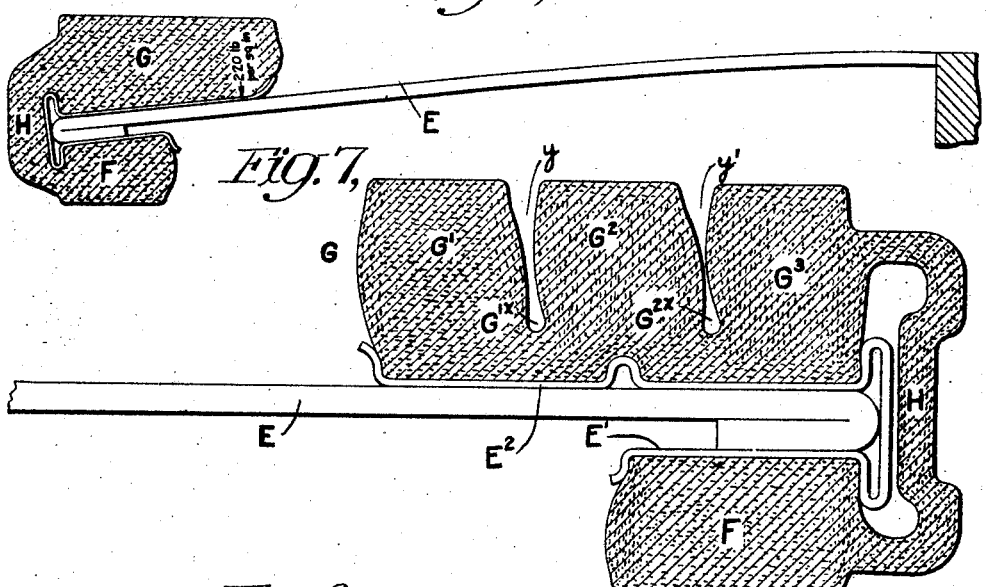
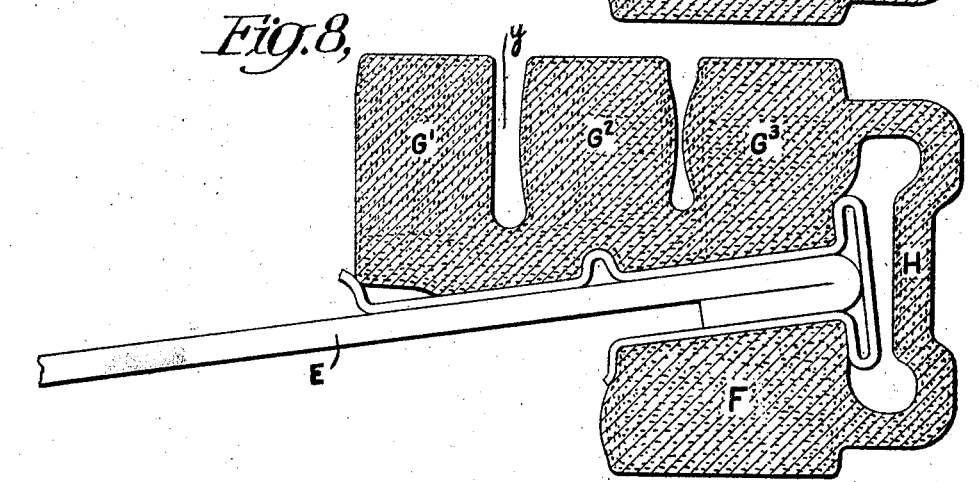

Patented Feb. 8, 1927.

1,616,613

UNITED STATES PATENT OFFICE.

CHARLES F. DRUMM AND ERVING R. GURNEY, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed October 2, 1925. Serial No. 59,977.

This invention relates to devices adapted to vary the effective length of a vehicle spring whereby its amplitude of vibration may be controlled in the interest inter alia of ease of riding. It has heretofore been proposed to reduce the effective length of a spring in its rebound movements, as by the provision of an element adapted to contact with the spring at a point between its connections with the frame and thus dampen its oscillations to a predetermined degree. It is one object of the present connection to provide damping means for the spring of a vehicle which shall serve to progressively vary the effective length thereof depending upon the degree of amplitude of the spring displacement resulting from rebound and loading. Accordingly an element is associated with either the spring or frame which is adapted to be engaged by one of these parts progressively as the load increases in order that the resiliency of the spring may be gradually decreased in direct relation to the increase of the load or the amplitude of spring movement in rebound or vice versa. More particularly the progressive damping of the spring is effected by the interposition between the spring and frame of a resilient cushioning element of either metallic or non-metallic material. In the U. S. patent to Masury and Leipert No. 1,404,876, filed January 31, 1922, there is disclosed a cushion connection between two relatively movable parts of a vehicle, one of which parts is to be connected to and supported by the other part. It is a further object of the invention to associate with a cushion connection based on the broad patented principle the progressive damping cushion. Accordingly the load section of the cushion connection may have associated therewith a block of yielding non-metallic material operatively interposed between the spring and the frame and extending along the spring length in such a manner that a greater area of the spring is engaged by the block on its upper surface than on the lower surface of the spring and the area of the upper spring surface engaged by the block varies progressively as the load or amplitude of spring deflection varies. The invention also has to do with a practical structure involving the principles hereinbefore discussed which shall meet the requirements of present day manufacture and use. To this end, for instance, the overload cushion may be formed with one or more interstices which shall allow for deformation of the cushion under varying degrees of compression. The invention will now be described more particularly in connection with a preferred embodiment thereof which is illustrated in the accompanying drawings and in which:

Figure 1 is a longitudinal vertical sectional view of a connection between the spring and frame in a vehicle having associated therewith a cushioning element adapted to have a progressive damping effect on the spring whereby its effective length may vary under varying conditions.

Figure 2 is a view of the connection illustrated in Figure 1 taken in the plane indicated by the line 2—2 in that figure and looking in the direction of the arrows.

Figure 3 is a somewhat schematic view showing the position taken by a spring under rebound conditions and the points along the length thereof at which the spring is dampened under the different indicated loads.

Figure 4 is a view of the overload cushion showing the loads which, when applied, effect the damping of the spring at the various points indicated whereby a shortening of the effective length of the spring is attained.

Figure 5 is a view of the spring showing the overload cushion under normal load conditions.

Figure 6 is a view of the spring showing the overload cushion under extreme conditions of shock applied to the wheel of a vehicle as when the wheel strikes an obstruction in the roadway.

Figure 7 is a fragmentary view showing the shape assumed by the modified damping connection illustrated in Figures 1 and 2 under conditions of load.

Figure 8 is a view showing the form assumed by the connection according to Figure 7 under conditions of rebound.

During the operation of a vehicle the amplitude of oscillation of a spring is, of course, dependent in great measure, on the inequalities in the roadway over which the vehicle is traveling and the frequency of vibration is dependent upon the spring length.

Given, therefore, a spring of predetermined length its rate of vibration will be constant for a given load but will vary in proportion as the load varies. It is proposed, therefore, according to the present invention to provide devices to dampen the vibration of the spring progressively as the load increases or as the tendency of the spring to increase the amplitude of its vibration under road shocks in order that its rate of vibration may be fairly constant and thus insure easy riding of the vehicle. According to the present invention this is accomplished by the provision of means which shall gradually or progressively contact with a greater proportion of the spring length as the load increases or as the amplitude of vibration under road shock increases in order to reduce the effective length of the spring under these conditions and conversely when the load of the vehicle decreases or the oscillation of the vehicle decreases due to its travel over a more even roadway to increase the effective length of the spring by the progressive removal of the damping means from contact with the spring.

In the patented construction there is illustrated a cushion connection between two relatively movable parts of a vehicle, such as the spring and the frame, wherein yielding non-metallic material is interposed as the connecting and supporting medium. In the preferred embodiment illustrated in that patent a rebound section beneath the end of the spring is connected to a load section between the top of the end of the spring and the chassis by a thrust section disposed at the end of the spring. In its broadest aspect the present invention contemplates the association with the patented construction of a cushioning contact element adapted to progressively affect the effective spring length. In some situations the load section of the patented construction may be considerably increased in size so as to contact for an appreciable distance in the longitudinal direction of the spring in situations of increased load or spring deflection. Figure 5, for instance, illustrates a broad aspect of the construction according to the present invention wherein the load section is indicated as a solid block at G, the thrust section at F and the rebound section at H, the spring being indicated at E. Figure 5 illustrates in general the position of the spring E under conditions of load wherein the effective length of the spring is shortened due to the damping action of the block $g$ contacting throughout substantially its entire length with the upper surface of the spring. In Figure 4 there is illustrated the manner in which the effective length of the spring is varied by an increase in the load. For instance, with a load of 200 lbs. per sq. in. upon the connection the point of application of the load is at the arrow indicated by the numeral 200 and the spring is shortened by only the distance between the rear face $x$ and the arrow marked 200. With a load of 230 lbs. per sq. in. the effective length of the spring is shortened by a distance between the rear face $x$ and the arrow marked 230.

Figures 7 and 8 illustrate what may be termed a preferred construction of the invention wherein the load section G is composed of a plurality of substantially independent blocks $G'$, $G^2$, $G^3$, these blocks being connected at their lowermost portions at $G'^x$, $G^{2x}$. A spring seat $E'$, $E^2$ is shown on the end of the spring E. In Figure 7 the spring is illustrated as under considerable load with the result that the block $g$ is under considerable compression, the block $g^2$ under slight compression and the block $g'$ under still less compression as will be noted on considering the degree of distortion of the blocks. In Figure 8 the spring E is illustrated as under rebound in which event the block $g'$ is under practically no compression while the blocks $g^2$ and $g^3$ are under progressively greater compression. Obviously, since the block $g'$ is under no compression it has no damping effect on the spring, the point of termination of the effective length of the spring being determined as indicated in Figures 3 and 4. In this connection it may be pointed out that the purpose of forming the load section $g$ of a plurality of substantial independent blocks $g'$, $g^2$, $g^3$ is in order to provide interstices $y$ affording space for the distortion of the block under conditions of load.

In Figures 1 and 2 there is illustrated one practical embodiment of the invention wherein a bracket $a$ is shown as secured in any convenient manner as to the side frame member $b$ of a vehicle. Secured to the bracket in any convenient manner either removably or permanently is a housing indicated as a whole at $c$ and formed of an upper member $c'$ having a relatively long upper surface $c^2$ and open at one end as at $c^3$ and below as at $c^4$. A closure or bottom seat element $d$ is adapted to be removably secured as by bolts or the like $d'$ to the side walls $c^5$ of the upper member. A spring or like element of a vehicle is indicated at $e$ and is adapted to enter the housing through the open end $c^3$. Disposed within the housing and engaging the end of the spring there will be observed a block or blocks of yielding non-metallic material. In the illustrated embodiment there is illustrated a rebound section $f$ which is relatively short in the longitudinal direction of the spring but wider in the transverse direction as seen in Figure 2. By the formation of the rebound section relatively short in the longitudinal direction of the spring a pivotal effect in a sense is obtained while at the same time side sway is avoided by the relatively great width of the cushion. This rebound section is illustrated as formed with pads or buffers $f'$ along the sides thereof which normally contact with the sides $d^2$ of the lower seat member $d$. The lower face of the block is engaged by a seat $d^3$ formed in the closure $d$ and the upper surface of the block is engaged by a seat $e'$. Carried with the end of the spring $e$, between the upper surface of the spring and the top wall $c^2$ of the housing, there is disposed a load section $g$ relatively long in the longitudinal direction of the spring, as illustrated in Figure 1 but narrower through the rebound section. Block $g$ may take the form illustrated in Figures 7 and 8 and comprises three substantially separate blocks or pedestals $g'$, $g^2$, $g^3$ connected for some distance along the lowermost portions of the proximate faces as at $g'^x$ and $g^{2x}$. The lower face of the block is engaged by a seat $e^2$ carried with the upper surface of the spring and the individual sections $g'$, $g^2$, $g^3$ of the block are disposed within seats in the upper wall $c^2$ indicated as at $c^{2x}$, $c^{2y}$ and $c^{2z}$ formed by depending ridges $c^7$. The block $g$ is also formed with cushions or pads $g^4$ at the sides thereof adapted to contact with the walls $c^5$. When the blocks are under extreme compression both the pads $f'$ and $g^4$ function to overcome objectionable side sway by contacting with the walls of the housing. Rearwardly of the end of the spring there is disposed a thrust cushioning section $h$ recessed as at $h'$ on the side adjacent the rear wall $c^6$ of the housing in the interest of resiliency and adapted to contact, upon elongation of the spring, with an abutment $e^3$ which is illustrated as forming a continuation and connection between the seats $e'$ and $e^2$. Abutment $e^3$ is re-enforced, it will be observed, by the end of the spring. The thrust section $h$ may be connected to the respective blocks $f$ and $g$ as by the flexible connecting portions $h^2$.

It will thus be seen that a connection has been afforded between the spring and frame of a vehicle wherein the effective length of the spring is proportioned to the load thereon in order that all of the advantages of a cushion connection of the patented kind hereinbefore referred to are attained with the added effect of damping the spring or changing its effective length under varying loads while at the same time affording accommodation for spring elongation.

Various modifications may be made in the form, arrangement and composition of the component elements forming the subject matter of the present invention and no limitation is intended by the foregoing description or illustrations except as indicated in the accompanying claims.

What I claim is:

1. In a connection of the character described, a housing carried with a vehicle frame, and having an open side into which an end of a spring extends, and yielding non-metallic material in the housing consisting of a portion mounted above the spring comprising a plurality of spaced columns and a portion mounted below the spring end.

2. In a connection of the character described, a housing carried with a vehicle frame, and having an open side into which an end of a spring extends, yielding non-metallic material in the housing, consisting of a portion mounted above the spring and comprising a plurality of spaced columns and a portion mounted below the spring end and being of greater width transversely of the block than the upper portion, whereby the second portion will prevent side sway of the chassis on the spring.

3. In a connection of the character described, a housing carried with a vehicle frame, and having an open side into which an end of a spring extends, a block of yielding non-metallic material in the housing, a portion of the block mounted above the spring and including a relatively long column and a portion of the block mounted below the spring end and comprising a relatively short column, the second portion being of a relatively greater width transversely of the block than the upper portion, whereby the second portion will prevent side sway of the chassis on the spring.

This specification signed this 30th day of Sept. A. D. 1925.

CHARLES F. DRUMM.
ERVING R. GURNEY.